(12) United States Patent
Burdis

(10) Patent No.: US 6,172,794 B1
(45) Date of Patent: Jan. 9, 2001

(54) ELECTROCHROMIC DEVICES

(75) Inventor: Mark Samuel Burdis, Ormskirk (GB)

(73) Assignee: Pilkington plc (GB)

(*) Notice: Under 35 U.S.C. 154(b), the term of this patent shall be extended for 0 days.

(21) Appl. No.: 09/125,634
(22) PCT Filed: Feb. 17, 1997
(86) PCT No.: PCT/GB97/00410
§ 371 Date: Aug. 22, 1998
§ 102(e) Date: Aug. 22, 1998
(87) PCT Pub. No.: WO97/31291
PCT Pub. Date: Aug. 28, 1997

(30) Foreign Application Priority Data

Feb. 23, 1996 (GB) .................................................. 9603851

(51) Int. Cl.⁷ ........................................................ G02F 1/53
(52) U.S. Cl. .................. 359/269; 359/267; 359/271; 359/274; 359/275
(58) Field of Search ................... 359/270–273, 359/265–269, 274, 275

(56) References Cited

U.S. PATENT DOCUMENTS

| Re. 34,469 | 12/1993 | Cogan et al. |
| 4,537,826 * | 8/1985 | Miyamura et al. ................... 428/328 |
| 4,573,768 * | 3/1986 | Polak et al. ........................... 350/357 |
| 4,824,222 | 4/1989 | Green . |
| 4,889,414 | 12/1989 | Rauh et al. |
| 4,938,571 | 7/1990 | Cogan et al. |
| 5,202,788 * | 4/1993 | Weppner ............................... 359/270 |
| 5,659,417 * | 8/1997 | Van Dine et al. ..................... 359/273 |

FOREIGN PATENT DOCUMENTS

| 36 29 879 | 3/1987 | (DE) . |
| 2081922 | 2/1982 | (GB) . |
| 2083643 | 3/1982 | (GB) . |
| 2183860 | 6/1987 | (GB) . |
| WO 89 12844 | 12/1989 | (WO) . |

OTHER PUBLICATIONS

Katsumi Nagase et al.; "Electrochromism of vanadium–titanium oxide thin films prepared by spin–coating method"; Department of Materials Science and Technology, Graduate School of Engineering Sciences, Kyushu University, Kasugashi, Fukuoka 816, Japan; Applied Physics Letters, Jul. 20, 1992, pp. 243–245; vol. 61, No. 3; 1992 American Institute of Physics.

Stuart F. Gogan et al.; "Optical properties of electrochromic vanadium pentoxide"; EIC Laboratories Incorporated, Norwood, Massachusetts; Journal of Applied Physics; Aug. 1, 1989; pp. 1333 and 1335; vol. 66, No. 3; 1989 American Institute of Physics.

* cited by examiner

*Primary Examiner*—Georgia Epps
*Assistant Examiner*—Evelyn A. Lester
(74) *Attorney, Agent, or Firm*—Marshall & Melhorn (57) ABSTRACT

An electrochromic device having successive layers of electrochromic electrolyte and counter-electrode materials. The counter-electrode material comprises an oxide of a mixture including at least two of vanadium, titanium and zirconium.

14 Claims, 7 Drawing Sheets

ELECTROCHROMIC DEVICES

BACKGROUND OF THE INVENTION

1. Technical Field

The invention relates to electrochromic devices as used, for example, in so-called variable transmission windows or variable reflection mirrors, and in particular to counter-electrode materials for such devices.

2. Background Art

Electrochromic devices are known to have successive layers of electrochromic, electrolyte and counter-electrode materials. The device may have first and second laminar substrates each covered on one side with an electrically conducting film, the layers interposed between the two substrates with the film covered sides innermost. Alternatively, the device may have one laminar substrate covered on one side with an electrically conducting film, the layers being carried on this film covered side with a further electrically conducting film applied over the exposed layer. The most common substrate material is glass, but plastics materials, like acrylic, may also be used.

By way of example, the electrically conductive films may be indium doped tin oxide, the electrochromic material may be tungsten trioxide, the counter-electrode material may be cerium titanium oxide and the electrolyte material may be a suitable polymer to which lithium perchlorate has been added.

A tungsten trioxide/cerium titanium oxide device can be changed between bleached and colored states by altering the applied electrical potential, that is, the potential applied via the electrically conductive films (acting as electrodes) across the electrochromic, electrolyte and counter-electrode layers. The polarity of the potential dictates the direction of transfer of cations (provided by the lithium perchlorate) through the electrolyte material, between the electrochromic and the counter-electrode materials. The cation transfer is reversible. When reduced, or in other words when cations are inserted, the electrochromic material is colored, whereas, when oxidized (when cations are de-inserted), it is virtually colorless. Conversely, the counter-electrode material is chosen because it is virtually colorless when either reduced or oxidized, or at least any coloring on reduction is indiscernible.

A tungsten trioxide/cerium titanium oxide device can be varied from a blue colored state to a pale yellow "colorless state".

Other electrochromic/counter-electrode material combinations may work in reverse, with the electrochromic layer coloring on oxidation, and different combinations can produce different colors and degrees of color change. There are also devices wherein a single layer acts as both the counter-electrode and the electrically conducting film. Furthermore, there are devices, such as those available from the Gentex company, which have a single material which functions as the electrochromic, counter-electrode and electrolyte layers.

The changeability of an electrochromic device lends itself to use in, amongst other applications, a window where variable transmission characteristics are required. These are seen as being of particular use in integrated energy management systems for buildings; one idea being to modulate the solar gain of the building to maximize energy benefits. For instance, by coloring the window during the hottest part of a summer's day, the amount of solar radiation entering a building can be minimized, and on dull winter days the window can be bleached so as to make best use of the available natural light.

The degree of coloration of an electrochromic device is related to the quantity of cations inserted into the electrochromic material and hence, in the case of an electrochromic material coloring on the insertion of cations, the extent of reduction, which is dictated by the amount of charge passed; the greater the charge passed, the deeper the color. One of the limiting factors on the amount of charge passed is the charge storage capacity of the counter-electrode material. For instance, in a device which has a tungsten trioxide electrochromic layer and a cerium titanium oxide counter-electrode layer, the depth of the blue coloration attainable is restricted by the tendency of the cerium titanium oxide to saturate at a charge density well below that which the tungsten trioxide can tolerate. Thus, the tungsten trioxide effectively has unutilized charge storage capacity.

In addition, the dynamic range of the device, that is the ratio of the colored to bleached state optical transmission, is preferably as wide as possible. Most effective use of a management system controlled electrochromic window is achieved if the device has as wide a dynamic range as possible. Optimization of the dynamic range is assisted by having the counter-electrode layer as near as possible equally optically transmitting in both the colored and bleached states of the device.

A counter-electrode material also needs to have good long term cycling stability and good electrochemical kinetics.

WO 89/12844 (EIC Laboratories Inc) discloses a counter-electrode material composed of a mixture of metal oxides in combination with an electrochromic material coloring on reduction. Proposed in WO 89/12844 are mixed oxides of materials such as vanadium or chromium either together or with oxides of niobium, tantalum or titanium. However, WO 89/12844 is directed to counter-electrode materials which complement the electrochromic material, that is to say, counter-electrode materials that are colored when oxidized and colorless when reduced, and the specific examples deal only with niobium/vanadium or chromium/vanadium oxides and their characteristics.

SUMMARY OF THE INVENTION

The invention provides an electrochromic device having successive layers of electrochromic, electrolyte and counter-electrode materials, characterized in that the counter-electrode material comprises an oxide of a mixture including at least two of vanadium, titanium and zirconium.

The counter-electrode materials according to the invention have been found to have a significantly increased charge storage capacity, in comparison to, for example, cerium titanium oxide, which in turn facilitates the utilization of the maximum charge storage capacity of the electrochromic material. Furthermore, the counter-electrode materials according to the invention have been found to have good optical density characteristics. A significant factor in this is that the counter-electrodes used in devices according to the invention exhibit minimal coloring in the "bleached state" of the device, thus maximize the optical transmission difference between the bleached to colored states. What is more, devices according to the invention are capable of high electrochromic efficiency, which is a measure of the change in optical density with charge. The potentially high overall electrochromic efficiency of the device is a result of the relatively low electrochromic efficiency of the counter-electrode material which will not therefore detract from the high electrochromic efficiency of whatever electrochromic material is used. The higher the electrochromic efficiency, the greater the optical density change for the quantity of charge passed. Hence, it is desirable to have as high an electrochromic efficiency as possible so as to bring about the maximum color change for the minimum amount of charge. The less the charge required, the quicker and cheaper the device is to run. Dynamics and cost are both important considerations for building energy management systems. However, the greater the charge capacity of the counter-electrode, the greater the opportunity for taking advantage of any high electrochromic efficiency of the device.

In addition, the counter-electrode materials according to the invention have been found to be electrochemically and mechanically stable and to enable faster preconditioning of the device (the process of initiating cation transfer by cyclically driving the device between predetermined positive and negative voltages).

The counter-electrode material according to the invention is colored when reduced and bleached when oxidized.

The mixture may include two of vanadium, titanium and zirconium in a percentage molar ratio of between 10:90 and 90:10. Preferably, the mixture includes two of vanadium, titanium and zirconium in a percentage molar ratio of 80:20, 60:40, 50:50, 40:60 or 20:80.

The counter-electrode layer may be between 100 and $10 \times 10^3$ Å thick. Preferably, the counter-electrode layer is between $1 \times 10^3$ and $3 \times 10^3$ Å thick.

The counter-electrode layer may be deposited by sputtering, preferably reactive dc magnetron sputtering, or any other suitable method for applying thin films to a substrate such as glass. The phrase "dc sputtering" as used herein means sputtering of single, dual or metal targets using an applied dc voltage. Preferably, the sputtering is carried out in an argon atmosphere containing between 0 and 100 volume % oxygen, at a total pressure of between $5 \times 10^{-4}$ and 0.1 mbar. Further preferably, the atmosphere contains between 10 and 50 volume % oxygen, at a total pressure of between $5 \times 10^{-3}$ and $5 \times 10^{-2}$ mbar. However, as will be appreciated, the most suitable sputtering conditions will be largely dependent upon the particular sputtering apparatus used. In the case of a single target sputtering, the target may be an intermetallic comprising metals melted together, a sintered or mixed metal oxide or any other suitable composition.

It has been found that higher charge storage capacities are obtained for higher deposition pressures and lower oxygen concentrations.

Most preferably the mixture includes vanadium and titanium. The most preferred mixture may be deposited by sputtering, in which case the percentage of oxygen admitted to and the pressure of the sputtering atmosphere and the thickness to which the counter-electrode layer is deposited may be selected to provide the required charge capacity. The vanadium content of the most preferred mixture may be selected to provide the required electrochromic efficiency for the device. Mixtures with a higher vanadium content show a reduction in their electrochromic efficiency as the amount of charge entered into the counter-electrode layer (charge density) is increased. On the other hand, the mixtures with a lower vanadium content show an increase in electrochromic efficiency as the charge density is increased. Mixtures between these extremes show an virtually unvarying electrochromic efficiency. Titanium in the counter-electrode layer appears to provide chemical stability; vanadium oxide is water sensitive and on its own is difficult to handle, but the addition of titanium adds stability to the mixture and significantly diminishes water sensitivity. The choice of the relative proportions of vanadium to titanium is a case of balancing charge storage capacity of the counter-electrode layer and the electrochromic efficiency of the device against the stability of the device.

Alternatively, the mixture includes vanadium, titanium and zirconium, for instance in a percentage molar ratio of 20:40:40, and such mixtures have shown properties comparable to vanadium/titanium mixtures.

The invention also provides use of an oxide of a mixture including at least two of vanadium, titanium and zirconium as a counter-electrode material for an electrochromic device.

The counter-electrode materials according to the invention may be used in conjunction with tungsten trioxide electrochromic layers and any of a range of electrolytes, but have proven to be particularly useful for electrochromic devices which have electrolyte layers of the composition disclosed in PCT/EP95/01861.

The counter-electrode materials according to the invention may also include other metals in addition to titanium, vanadium and zirconium.

An electrochromic device according to the invention is not only useable in a variable transmission window wherein the electrically conducting films will be translucent, but also in a variable reflection mirror (now used particularly for automobile rear view mirrors) wherein one of the electrically conducting films will be reflective.

DESCRIPTION OF THE PREFERRED EMBODIMENTS

Figure 1:
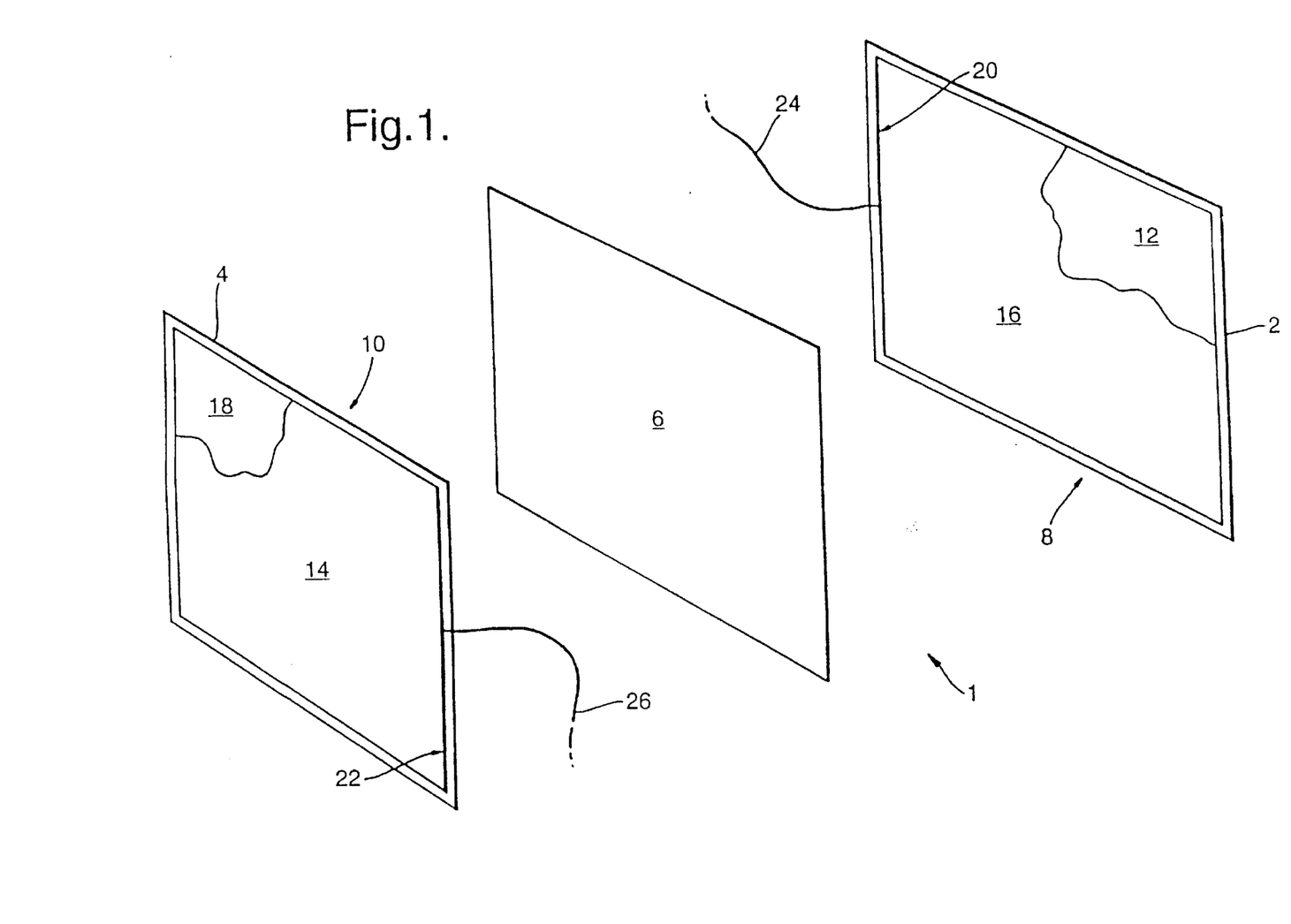
FIG. 1 is an exploded view of an electrochromic device according to the invention.
Figure 2:
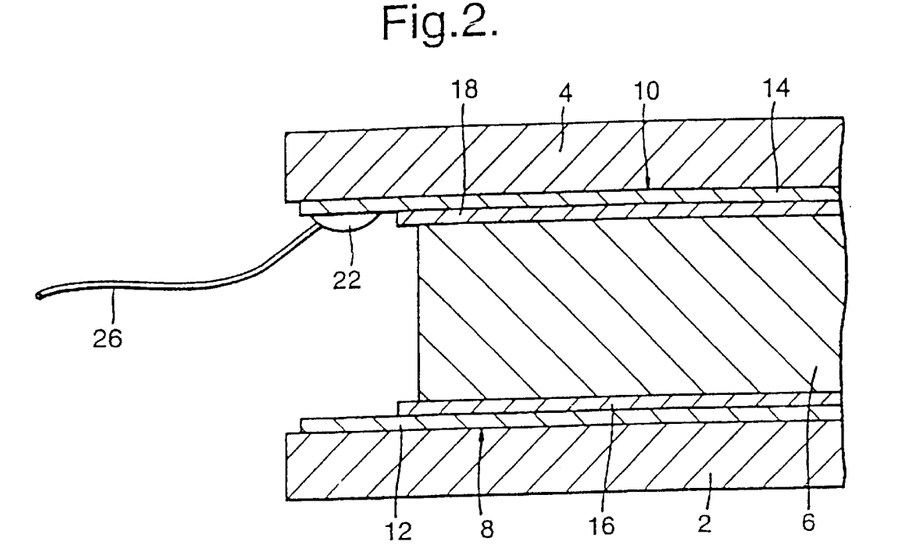
FIG. 2 is a partial transverse cross section of the device shown in FIG. 1.

With reference to FIGS. 1 and 2, the device indicated generally at 1 has first and second sheets of glass 2, 4 each 100 mm×100 mm, separated by a 1 mm thick translucent interlayer of polymer electrolyte 6, the composition of which is disclosed in PCT/EP95/01861. Each of the sheets is sputter coated on its inner face 8, 10 with an electrically conductive film 12, 14 of indium doped tin oxide (ITO).

Applied over the top of the ITO film 12, also by reactive dc magnetron sputtering, is an electrochromic layer 16 of tungsten trioxide, and applied over the top of the ITO film 14 is a counter-electrode layer 18. The counter-electrode layer 18 is applied by reactive dc magnetron sputtering as well, using an intermetallic target (not shown) of vanadium and titanium. The target is made up in the form of an alloy with vanadium and titanium in the desired molar ratio (99.5+% pure). The sputtering is carried out by conventional techniques in an argon atmosphere to which a small amount of oxygen is admitted. The counter-electrode layer 18 is laid down at a rate of 2 $\text{Ås}^{-1}$ to the desired thickness. Also applied over each ITO film 12, 14, along one vertical edge, is an elongate electrical contact, commonly known as a bus bar 20, 22. These are in the form of copper strips stuck on to the ITO films 12, 14 with conductive adhesive. Power supply wires 24, 26 are connected to each of the bus bars 20, 22.

The device 1 is put together as a cast-in-place laminate, using a known technique. First of all the two sheets 2, 4 are formed into a cell by bonding them together (the electrochromic and counter-electrode layers 16, 18 innermost) with double sided acrylic tape (not shown) between the margins of the two sheets 2, 4. Liquid electrolyte, previously degassed by stirring under vacuum, is poured into the cell. The electrolyte interlayer 6 is then cured and the cell is scaled with an epoxy resin (not shown). The device 1 is preconditioned by cyclically driving it between voltages of ±3V for gradually increasing periods of time.

The device 1 is driven by applying a constant current of 10 mA (which equates to approximately 150 $\mu\text{Acm}^{-2}$ for a device active area of 64 $\text{cm}^2$) through the tungsten trioxide layer 16, the electrolyte layer 6 and the vanadium titanium oxide layer 18, via the power supply wires 24, 26 and the ITO films 12, 14. As a protective measure, the applied voltage is never allowed to exceed ±3V. Applying a negative voltage to the tungsten trioxide layer 16, so as to generate a current flowing in a first direction, causes lithium ions from the electrolyte layer 6 to be inserted into the tungsten trioxide layer 16, which produces a visible blue coloration. Applying a positive voltage has the opposite effect, generating a current flowing in a second, opposite, direction, and the device 1 is bleached towards it colorless state. In the "colorless state" the vanadium titanium oxide counter-electrode layer is slightly colored. Any reference herein to a positive or negative voltage can be taken also to mean a "more positive" or "more negative" voltage as appropriate, for example a device may in some instances be "colored" by driving it from a fully bleached to a less bleached state without actually applying a negative voltage.

EXAMPLE 1

A device was put together as described above with a counter-electrode layer comprising an oxide of a mixture of vanadium and titanium with the vanadium:titanium in a percentage molar ratio of 80:20. The layer 18 was 3000 Å thick and was applied by reactive dc magnetron sputtering in an argon atmosphere to which 5 volume % oxygen was admitted at a total pressure of $3 \times 10^{-2}$ mbar.

EXAMPLES 2–5

Devices were also made with counter-electrode layers applied under the same conditions and to the same thickness as in example 1 except that different targets were used so as to result in oxides of a mixture of vanadium and titanium with the vanadium:titanium in percentage molar ratios of 60:40, 50:50, 40:60 or 20:80 respectively.

The charge storage capacity of each of the counter-electrode layers incorporated in example devices 1–5 was measured by a potential step method with charge integration using an electrochemical interface, available in the UK from OxSys Micros Ltd, driven using software developed by the applicants.

Figure 3:
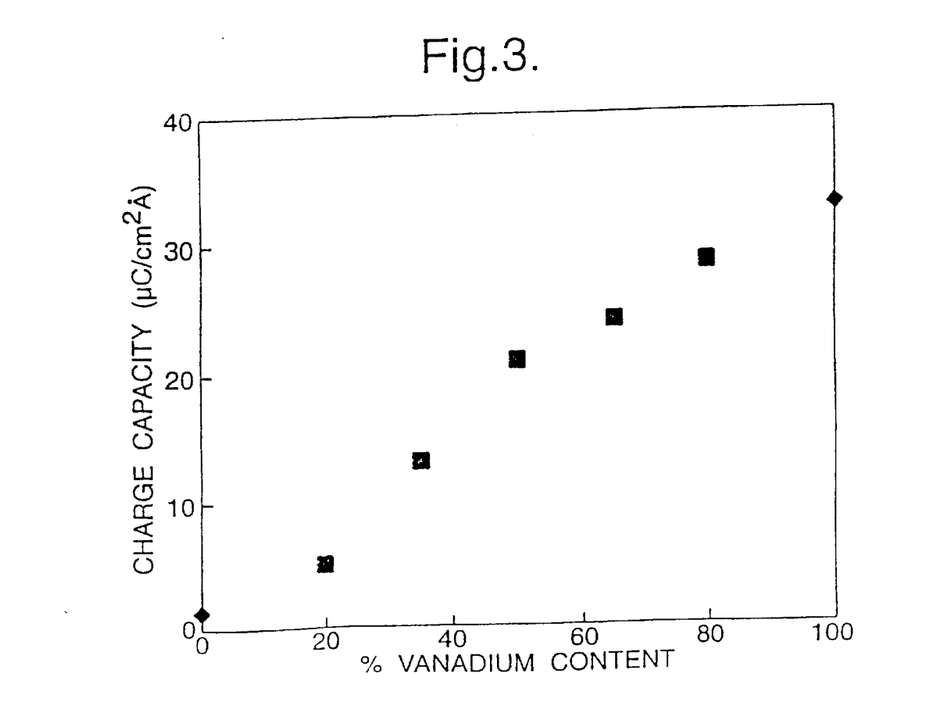
FIG. 3 is a graph of charge storage capacity against percentage vanadium content for counter-electrode layers incorporated into electrochromic devices according to the invention.

FIG. 3 illustrates how charge storage capacity per unit thickness of the counter-electrode layers incorporated in example devices 1–5 increases with vanadium content.

Figure 4:
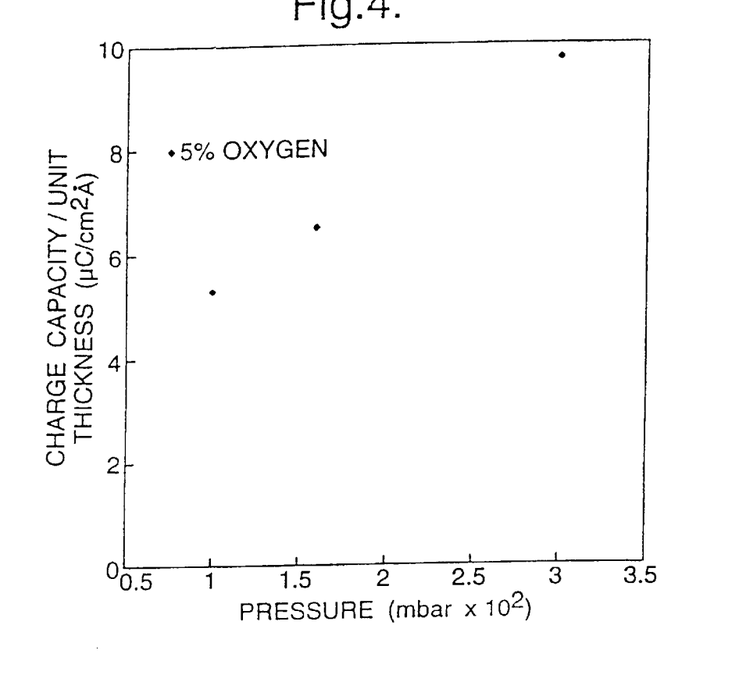
FIG. 4 is a graph of charge storage capacity per unit thickness against deposition pressure for a sputtered counter-electrode layer suitable for incorporation into an electrochromic device according to the invention.

FIG. 4 illustrates how charge storage capacity per unit thickness of a counter-electrode layer increases with the pressure at which it is sputtered. The measurements shown are for a counter-electrode layer of the same composition as the layer incorporated in example device 2, that is with vanadium and titanium in the percentage molar ratio 60:40, and 5 volume % oxygen admitted during sputtering.

Figure 5:
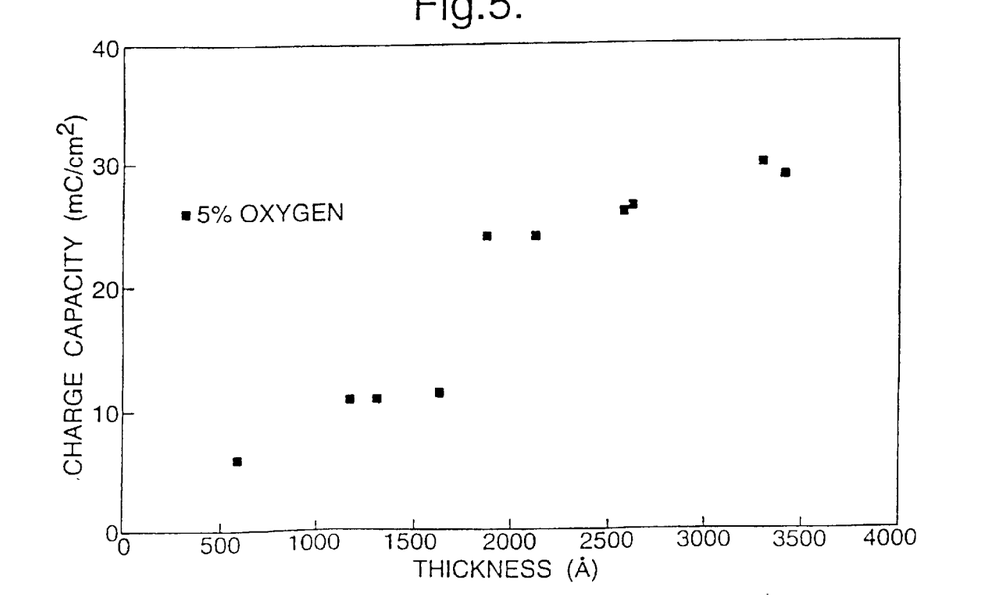
FIG. 5 is a graph of charge capacity against thickness for a sputtered counter-electrode layers suitable for incorporation into electrochromic devices according to the invention.

FIG. 5 illustrates how charge storage capacity of a counter-electrode layer of the same composition as the layer incorporated in example device 2 increases with thickness. The layer was sputtered at a total pressure of $3 \times 10^{-2}$ mbar with 5 volume % oxygen admitted.

Figure 6:
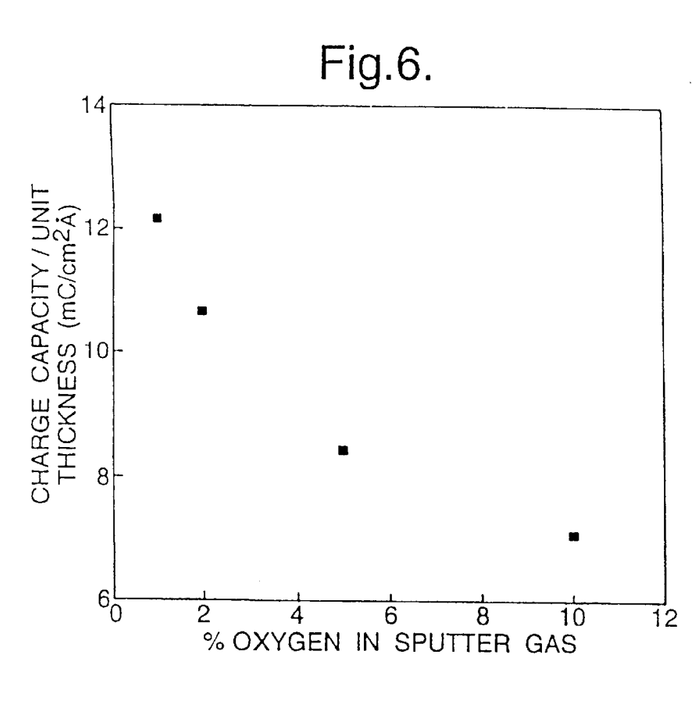
FIG. 6 is a graph of charge storage capacity per unit thickness against percentage oxygen in sputter atmosphere for a sputtered counter-electrode layer suitable for incorporation into an electrochromic device according to the invention.
Figure 7:
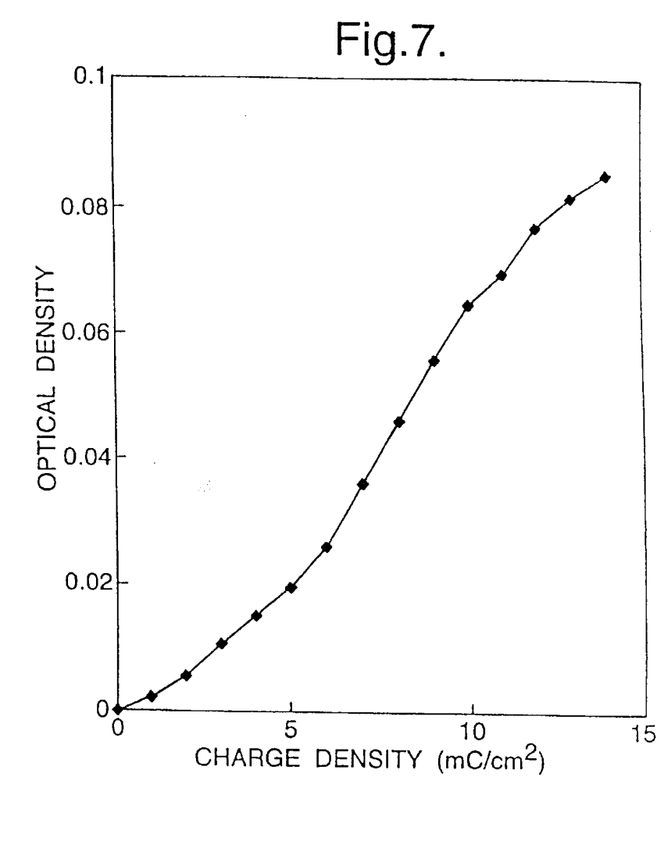
FIGS. 7–11 are graphs of optical density against charge density for counter-electrode layers suitable for incorporation into an electrochromic device according to the invention.
Figure 8:
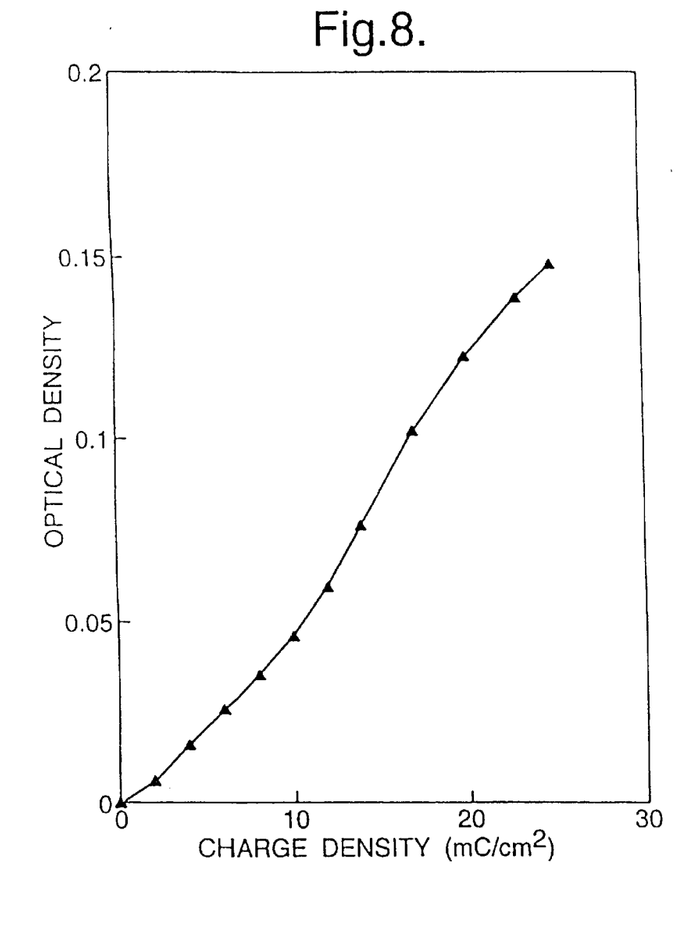
Figure 9:
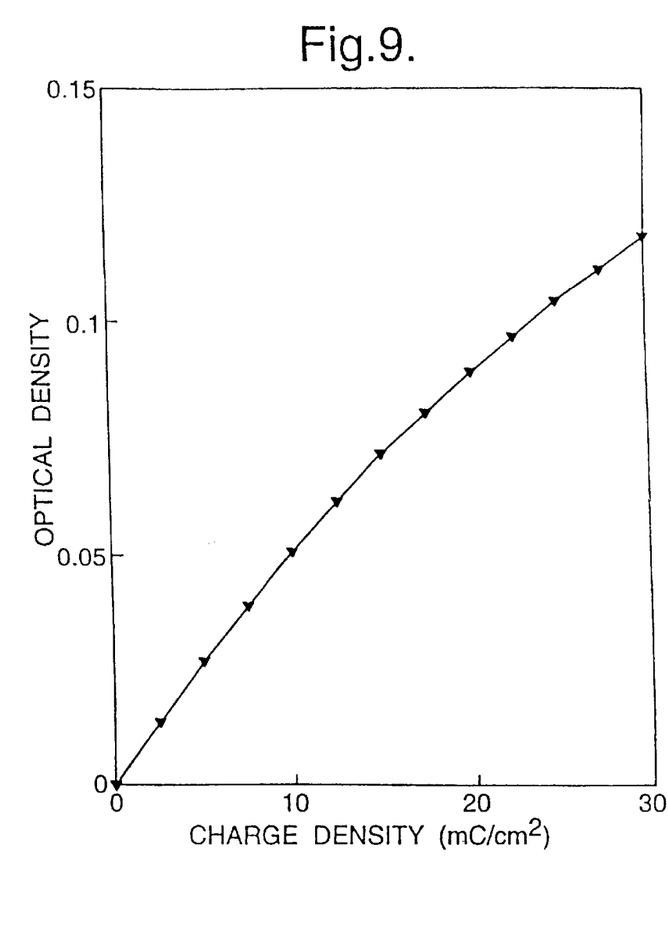
Figure 10:
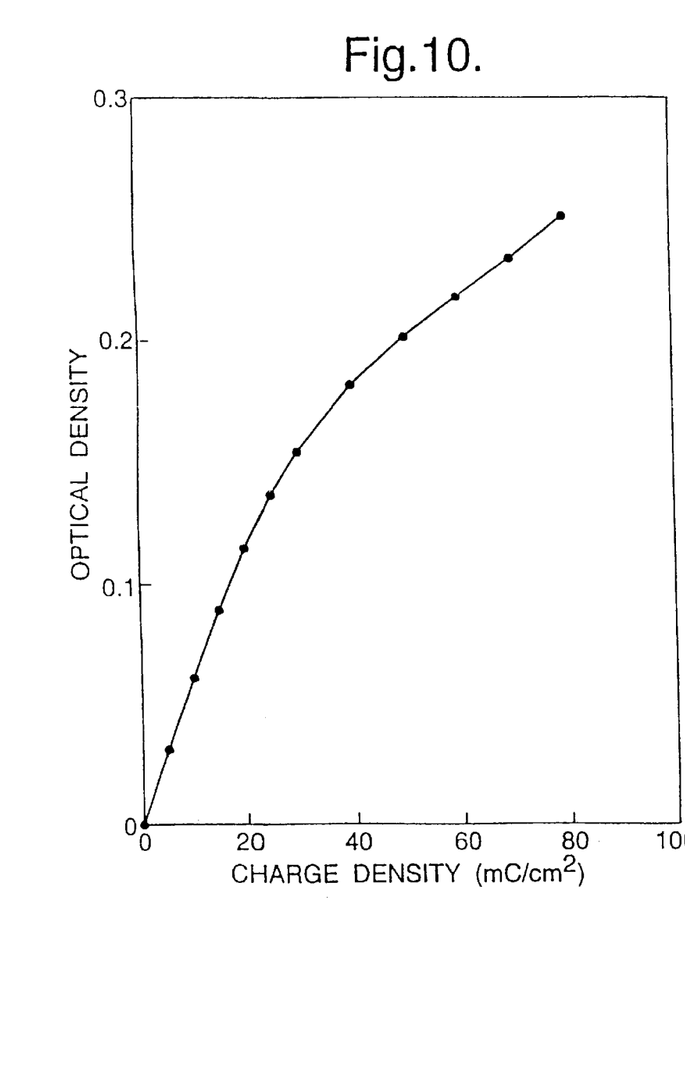
Figure 11:
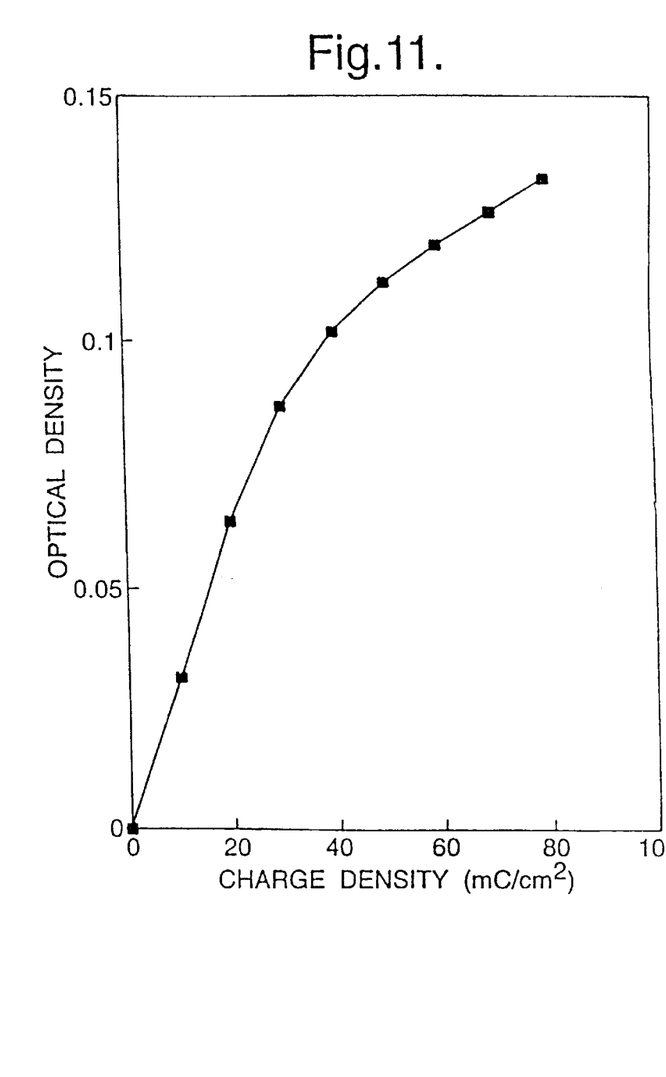

FIG. 6 illustrates how charge storage capacity per unit thickness of a counter-electrode layer with the same composition as the layer incorporated in example device 2 decreases with the volume percentage of oxygen admitted during sputtering. The sputtering was carried out at a total pressure of $3 \times 10^{-2}$ mbar.

The optical transmission of each of the counter-electrode layers incorporated in example devices 1–5 was measured by means of an electrochemical cell (not shown) comprising electrodes submerged in a liquid electrolyte. One of the electrodes was a counter-electrode layer as incorporated into example devices 1–5 on a glass substrate. Measurements were taken using a spectrophotometer, such as those available in the UK from the Hitachi company under the designation U-4000, and by appropriately modifying the cell to gain optical access to the counter-electrode layers. The potential applied and the injected current were controlled using an electrochemical interface, available in the UK from the Schlumberger company under the designation 1286. In this way, the amount of charge inserted into the layer could be accurately controlled.

Initially, measurements were taken of the optical transmission of the counter-electrode layers with no inserted charge, in the bleached state, providing the value $T_0$. Then, each layer was supplied with constant current by the electrochemical interface for a measured time, to allow calculation of the total charge inserted during reduction. Further optical transmission values, $T_{lum}$ were measured as the charge was increased and the layer became more colored. From the measurements, optical density was calculated, being related to the ratio of the $T_{lum}$ to $T_0$, as a function of charge density, the total charge inserted per unit area of counter-electrode layer.

FIGS. 7–11 illustrate how the optical density of the counter-electrode layers of the type used in each of the example devices 1–5 varies respectively. The rate of change of optical density with charge density is termed the electrochromic efficiency. Thus, the electrochromic efficiency can be calculated for each counter-electrode layer from the gradient of the plots shown in FIGS. 7–11. The high vanadium content mixture (FIG. 7) exhibits a reduction in electrochromic efficiency as the charge density is increased. The low vanadium content mixture (FIG. 11) exhibits an increase in electrochromic efficiency as the charge density is increased. The mixtures in between show a transition between these two extremes, with the 50:50 mixture (FIG. 9) exhibiting a virtually unvarying electrochromic efficiency.

The counter-electrode optical density and electrochromic efficiency characteristics shown in FIGS. 7–11 are relatively low in comparison to those of the tungsten trioxide electrochromic layer used in the example devices at the same charge densities, and therefore the overall electrochromic efficiency of the device is substantially that of the electrochromic layer.

Figure 12:
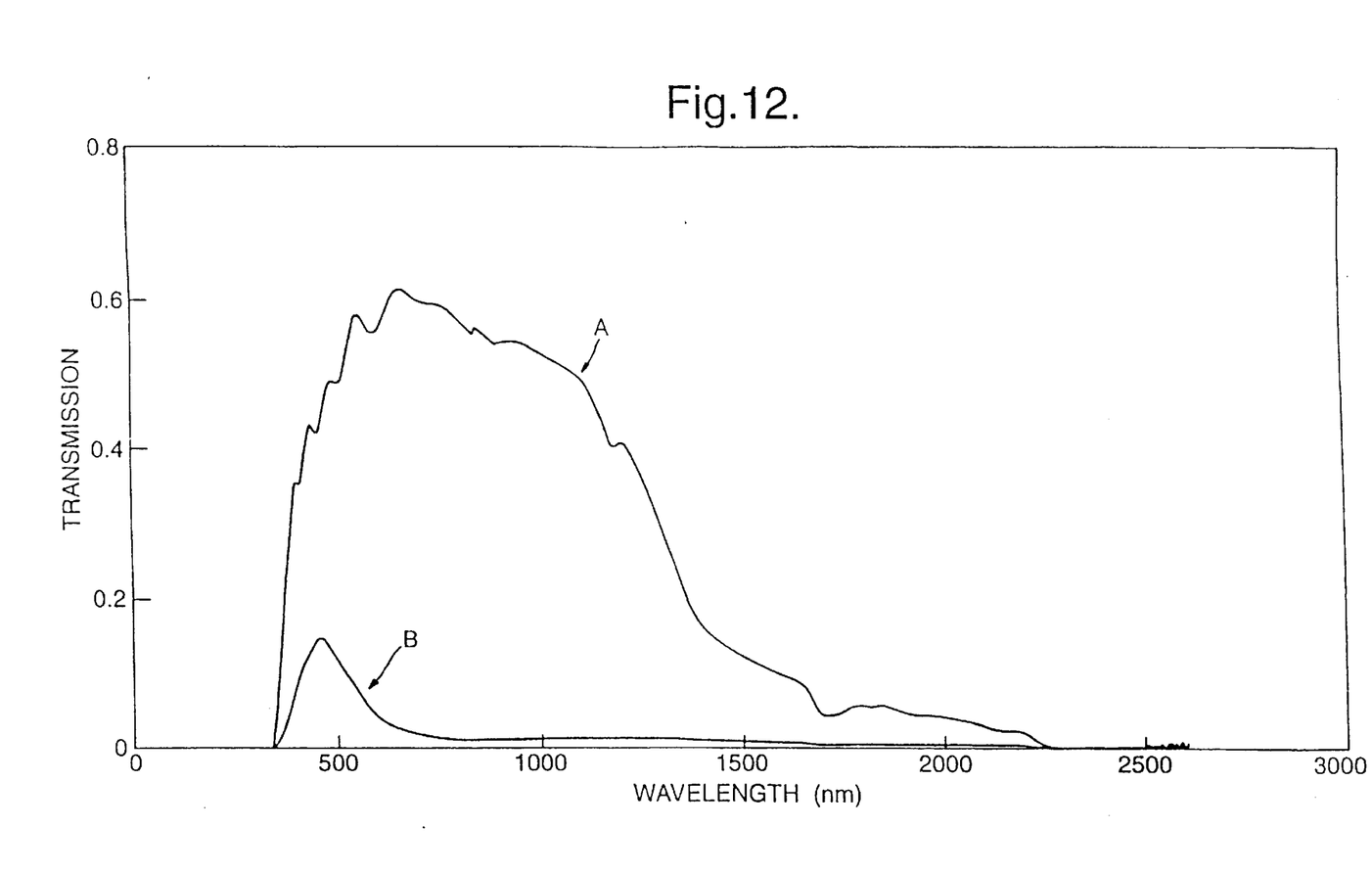
FIG. 12 is a graphical illustration of the transmission characteristics of an electrochromic device according to the invention.

FIG. 12 is a graph of transmission against wavelength for example device 3. The transmission is measured on a scale of 0, opaque to 1, transparent over wavelengths of 240–2600 nm, which covers the visible and adjacent parts of the spectrum. The upper curve A plots the transmission of the device 1 in the fully bleached state and the lower curve B plots the transmission in the fully colored state. Both curves were measured after the device had been cyclically driven in the region of 18000 times between fully colored and fully bleached states. Included in the table below are values calculated using the data plotted in FIG. 13 which show the difference in the luminous and direct solar transmittance (expressed as percentages) between the fully bleached and fully colored states.

|  | Luminous | Direct solar |
| --- | --- | --- |
| Colored | 7.3 | 4.0 |
| Bleached | 54.1 | 48.2 |

The luminous and direct solar transmittance are calculated in accordance with the Japanese Industrial Standard, JIS, R3106-1985.

What is claimed is:

1. An electrochromic device having successive layers of electrochromic, electrolyte and counter-electrode materials which is characterized in that the counter-electrode material comprises an oxide of a mixture consisting essentially of at least two of vanadium, titanium and zirconium, wherein the counter-electrode material is colored when reduced and bleached when oxidized.

2. An electrochromic device according to claim 1 wherein the counter-electrode layer is deposited by sputtering.

3. An electrochromic device according to claim 2 wherein the counter-electrode layer is deposited by dc reactive magnetron sputtering.

4. An electrochromic device according to claim 2 wherein the sputtering is carried out in an argon atmosphere containing between 0 and 100 volume % oxygen, at a total pressure of between $5 \times 10^{-4}$ and 0.1 mbar.

5. An electrochromic device according to claim 4 wherein the atmosphere contains between 10 and 50 volume % oxygen, at a total pressure of between $5 \times 10^{-3}$ and $5 \times 10^{-2}$ mbar.

6. An electrochromic device according to 5 wherein the target used for sputtering is an intermetallic or sintered oxide.

7. An electrochromic device according to claim 1 wherein the mixture includes vanadium and titanium.

8. An electrochromic device according to claim 7 wherein the oxide of the mixture of vanadium and titanium is deposited by sputtering and wherein the percentage of oxygen admitted to and the pressure of the sputtering atmosphere and the thickness to which the counter-electrode layer is deposited are selected to provide the required charge storage capacity.

9. An electrochromic device according to claim 7 wherein the vanadium content of the mixture is selected to provide the required electrochromic efficiency.

10. An electrochromic device having successive layers of electrochromic, electrolyte and counter-electrode materials which is characterized in that the counter-electrode material comprises an oxide of a mixture consisting essentially of at least two of vanadium, titanium and zirconium, wherein the mixture includes two of vanadium, titanium and zirconium in a percentage molar ratio of between 10:90 and 90:10.

11. An electrochromic device according to claim 10 wherein the mixture includes two of vanadium, titanium and zirconium in a percentage molar ratio of 80:20, 60:40, 50:50, 40:60 or 20:80.

12. An electrochromic device having successive layers of electrochromic, electrolyte and counter-electrode materials which is characterized in that the counter-electrode material comprises an oxide of a mixture consisting essentially of at least two of vanadium, titanium and zirconium, wherein the counter-electrode layer is between 100 and $10 \times 10^3$ Å thick.

13. An electrochromic device according to claim 12 wherein the counter-electrode layer is between $1 \times 10^3$ and $3 \times 10^3$ Å.

14. An electrochromic device having successive layers of electrochromic, electrolyte and counter-electrode materials which is characterized in that the counter-electrode material comprises an oxide of a mixture consisting essentially of vanadium, titanium and zirconium.

\* \* \* \* \*